United States Patent [19]

Rockola et al.

[11] 4,258,838
[45] Mar. 31, 1981

[54] AUTOMATIC PHONOGRAPH BONUS AWARD SYSTEM

[76] Inventors: Donald C. Rockola, 1555 North Astor, Chicago, Ill. 60610; Michael Schneider, 5537 N. Canfield Ave., Chicago, Ill. 60656; Leonard A. Distaso, 251 Warwick Dr., Campbell, Calif. 95008

[21] Appl. No.: 89,366

[22] Filed: Oct. 30, 1979

[51] Int. Cl.³ .............................................. G11B 19/08
[52] U.S. Cl. ...................................... 194/1 R; 194/15; 273/138 A; 369/34
[58] Field of Search .................... 194/1 R, 9 R, 15; 273/138 A; 274/10 D; 340/162

[56] References Cited

U.S. PATENT DOCUMENTS

| | | | |
|---|---|---|---|
| 2,717,781 | 9/1955 | Reykjalin | 194/15 X |
| 2,757,772 | 8/1956 | Killian | 194/15 |
| 4,013,157 | 3/1977 | Britz et al. | 194/15 |
| 4,091,437 | 5/1978 | Soroka | 194/15 X |
| 4,180,802 | 12/1979 | Oosterhouse | 194/15 X |

*Primary Examiner*—Joseph J. Rolla
*Attorney, Agent, or Firm*—McCaleb, Lucas & Brugman

[57] ABSTRACT

A bonus award system for an automatic phonograph offers bonus pricing during bonus time intervals. Optionally operable means are provided for initiating bonus intervals in the absence or presence of record plays during random time intervals, which are determined in part by phonograph customer activity.

7 Claims, 4 Drawing Figures

AUTOMATIC PHONOGRAPH BONUS AWARD SYSTEM

BACKGROUND OF THE INVENTION

1. Field of the Invention

This invention relates in general to automatic currency-controlled phonographs and, more particularly, to bonus or bargain merchandising systems for use in such phonographs.

2. Description of the Prior Art

Currency-operated automatic phonographs or jukeboxes have incorporated devices for awarding bargain pricing under predetermined conditions. For example, Britz et al U.S. Pat. No. 4,013,157 discloses a bonus play arrangement with a "random event generator" comprising an event scaler. In this device, a credit circuit provides a fixed credit when a first fixed currency amount is deposited. Upon the deposit of a second fixed currency amount, an additional fixed credit is provided along with a bonus credit if the random event generator is in its bonus credit condition.

Jensen et al U.S. Pat. No. 3,263,788 describes a scan award system adapted to vend an awarded record selection under certain conditions at a bargain price for a limited time interval. In this device, the customer has no control over which record selection is made available during the bonus period.

In order to maximize customer interest, in some automatic phonograph installations or locations it is desirable to initiate bonus offers when the machine has not been played for a predetermined time interval. In other instances, it is desirable to provide bonuses when the phonograph has been played for a similar time period. To applicants' knowledge, prior automatic phonograph bonus award devices do not permit phonograph operators to select under what conditions bonuses are to be awarded to customers in accordance with varying merchandising requirements.

SUMMARY OF THE INVENTION

According to the present invention, a microprocessor-controlled automatic phonograph provides bonus intervals during which customers are offered bargain pricing. A visual indicator signals when the machine is in one of its bonus modes. According to one mode of operation, if the machine is idle for a period of time called the random time interval, bonus pricing will be offered for a limited time following the random time interval. According to another mode, if the machine is in play for the random time interval, an identical bonus pricing scheme will be offered, again at the termination of the random time interval. The operator of the automatic phonograph has the option of selecting either or both modes of operation in order to maximize customer interest in the phonograph. As an additional attraction, an optional random play feature selects record selections for free play at the conclusion of random time intervals. The random time intervals are determined in part by phonograph customer activity in order to make the initiation of the bonus or random play mode appear to customers as being truly random.

Accordingly, it is an important object of the present invention to provide an automatic phonograph bonus award system which permits the phonograph operator to select whether bonus pricing will be offered to customers at apparently random time intervals when the phonograh is idle or playing.

It is a further important object of the present invention to provide an optional random play feature which permits apparently random free play of predetermined record selections.

Yet another important object of the present invention is to provide a bonus award system in which the random time intervals preceding bonus intervals appear to the phonograph customers to be random in order to maximize customer interest.

These and other important objects of the present invention will become apparent from the following description which, when taken in conjunction with the accompanying drawings, discloses a preferred embodiment of the invention.

DESCRIPTION OF THE PREFERRED EMODIMENT

Figure 1:
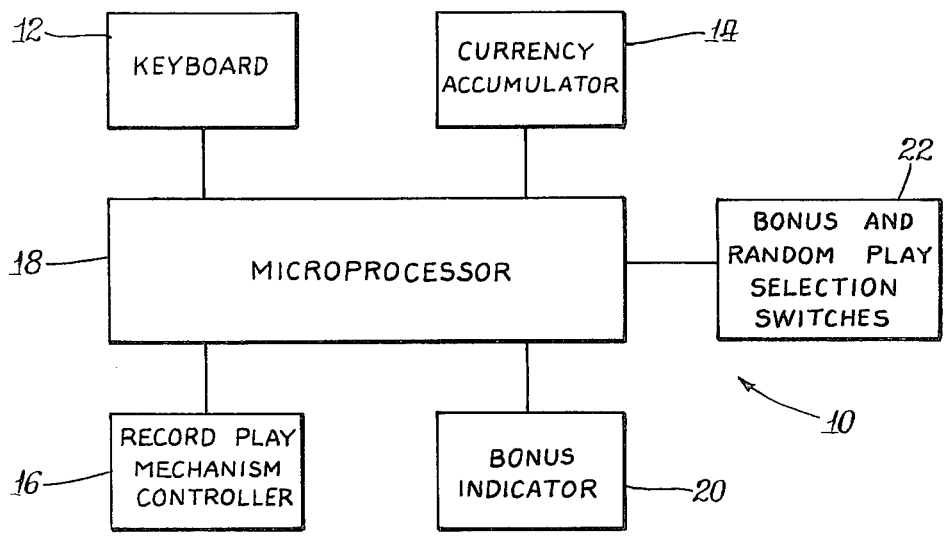
FIG. 1 is a block diagram illustrating the basic features of a microprocessor-controlled automatic phonograph embodying the present invention.

With reference to FIG. 1, an automatic currency-controlled phonograph, generally designated by reference numeral 10, comprises a known manually operable keyboard 12 for selecting record plays, a known currency accumulator 14 for storing play credits and a known record play mechanism controller 16 which includes a record magazine. Under control of a microprocessor 18, the mechanism controller plays records stored in the record magazine and selected by the keyboard 12 upon sufficient deposit of currency in the accumulator 14. Signals from the keyboard 12 and the currency accumulator 14 are decoded by the microprocessor 18.

A bonus indicator 20 of conventional design is controlled by the microprocessor 18 to provide visual indication to phonograph customers when the phonograph is in one of its bonus modes. A set of manually operable bonus and random play switches 22 control the microprocessor 18 to initiate one or more of the following bonus conditions. In the first mode of operation, called mode A, if the automatic phonograph has not played any records throughout a time period called the random time interval, bonus pricing will be offered, for play of any of the record selections stored in the magazine, during a bonus interval preferably on the order of three minutes. In another mode of operation, called mode B, a similar bonus offer will occur at the expiration of the random interval if the phonograph has been playing records throughout the random interval. In a random play mode, one of a predetermined number of record selections will be transmitted to the phonograph record play mechanism controller for free play at the termination of each random time interval. The switches 22 control the microprocessor to permit any combination of the mode A, mode B or random play functions.

Figure 4:
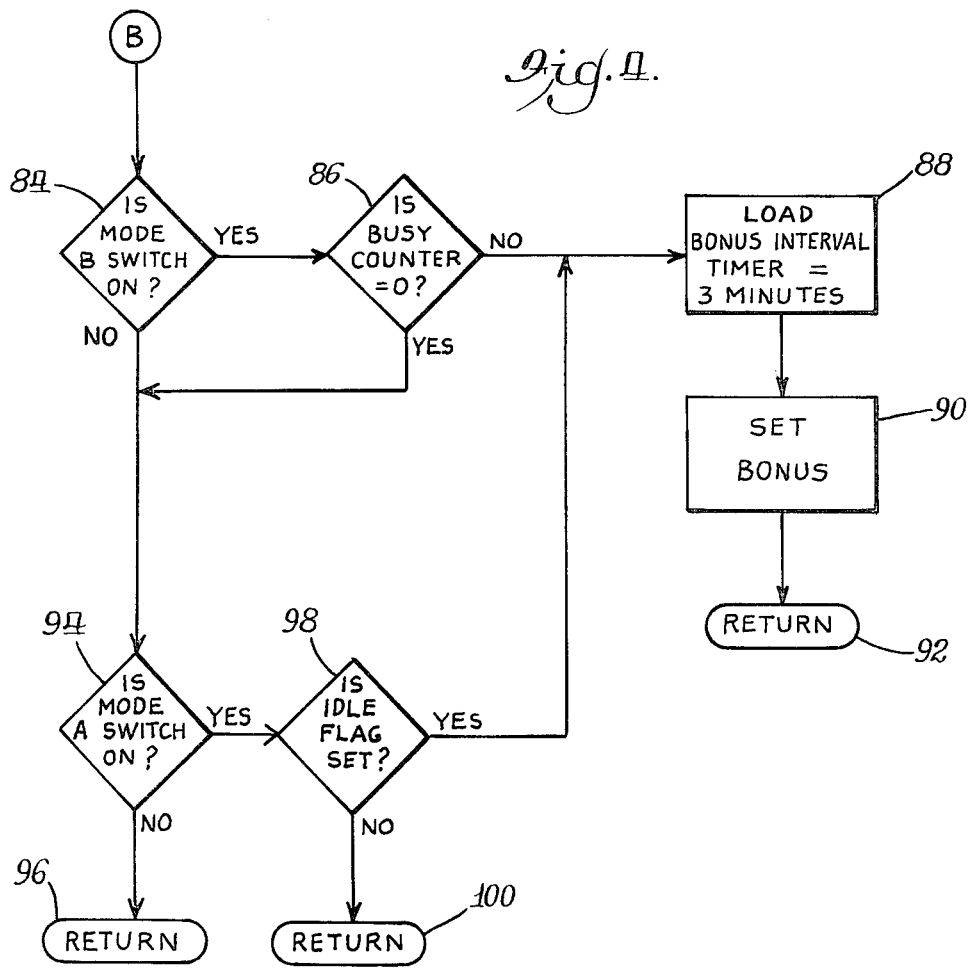
FIGS. 2 through 4 are microprocessor software logic flow charts or diagrams illustrating the microprocessor program for providing the bonus award features of the preferred embodiment of the present invention.
Figure 2:
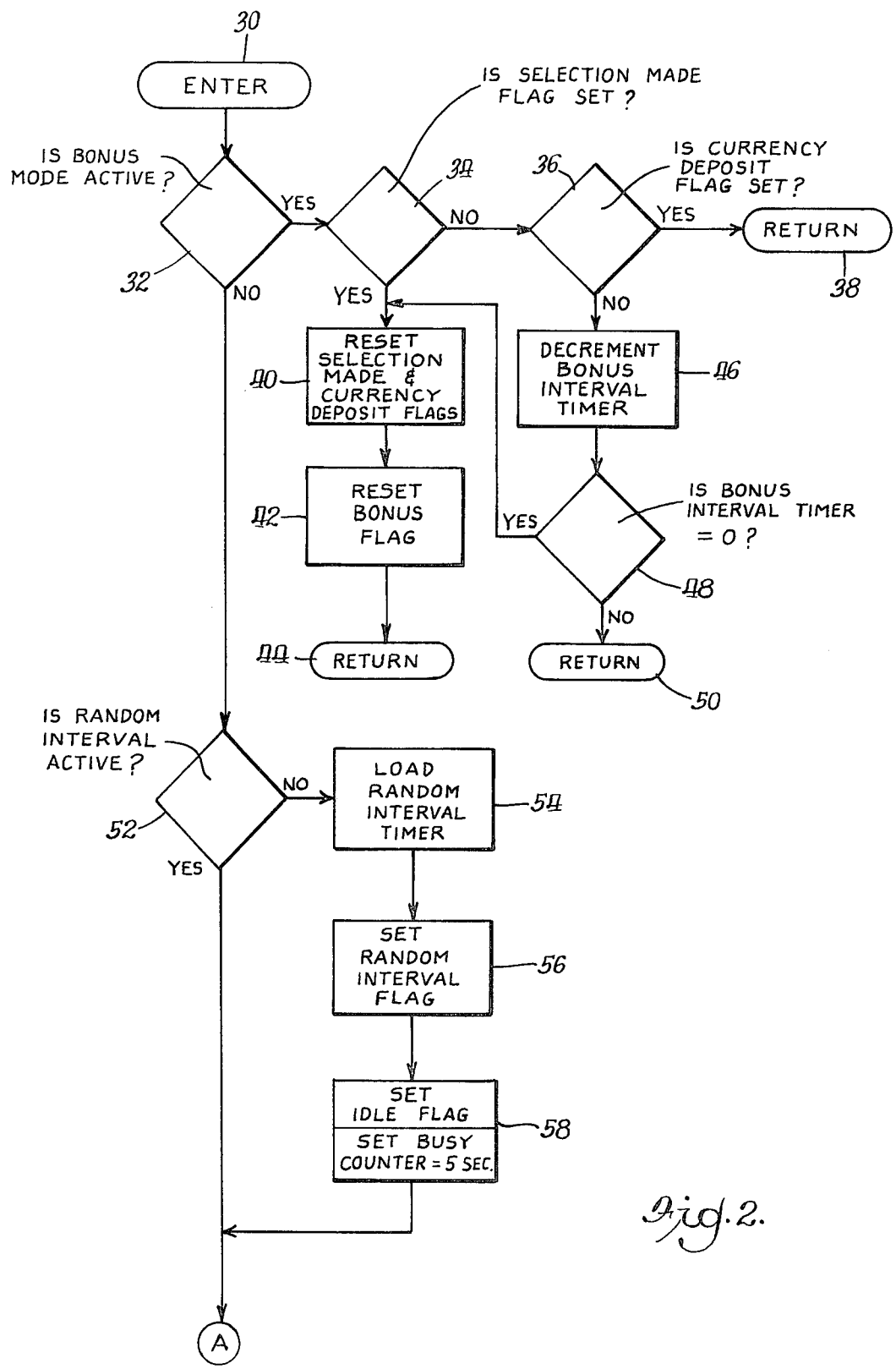
Figure 3:
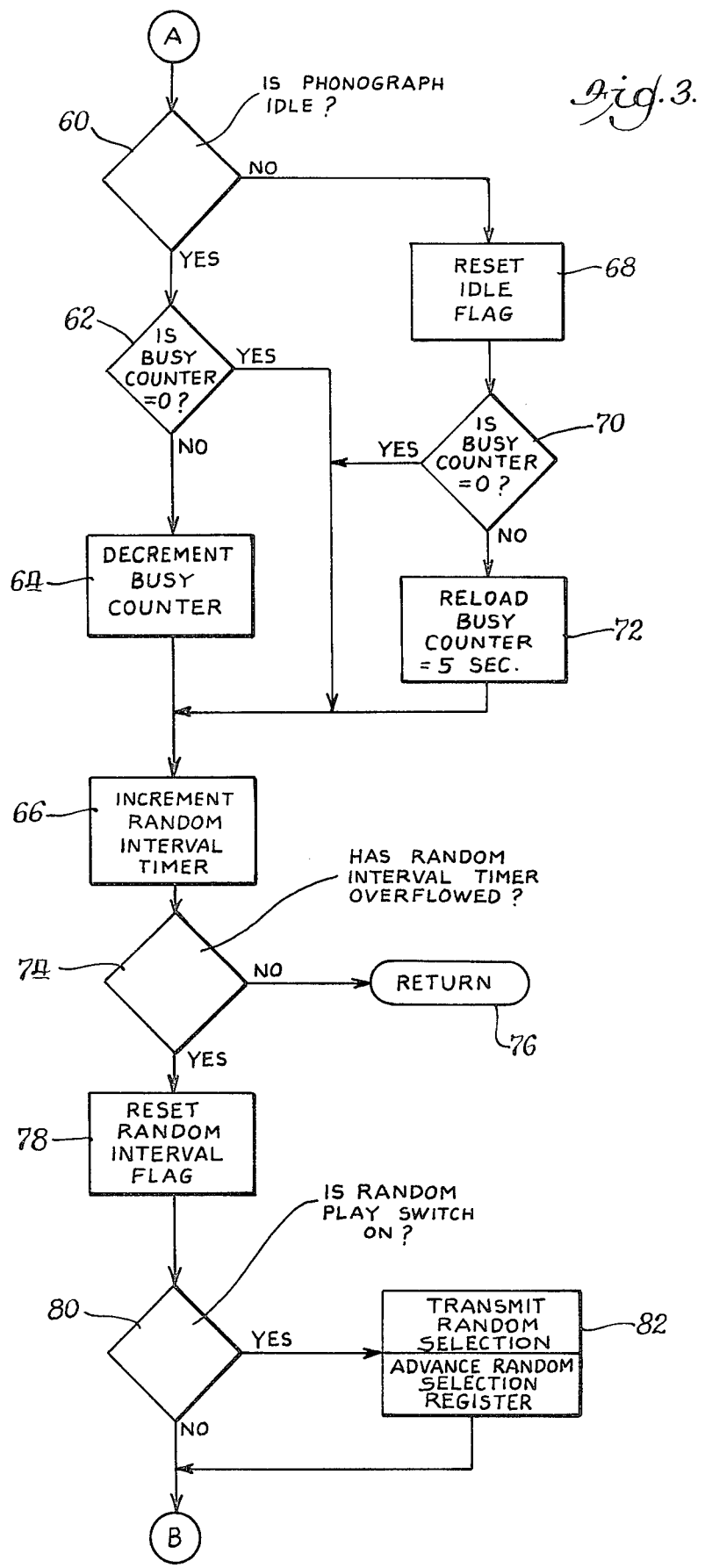

FIGS. 2 through 4 illustrate the program for the microprocessor 18. With reference to FIG. 2, after the program for the microprocessor is entered at a command 30, a decision block 32 reads the setting of a bonus flag which indicates whether the bonus mode is active or operational. If so, another decision block 34 determines whether a selection made flag has been set upon completion of a record selection at the record selection keyboard 12. Following decision block 34, if a record selection has not yet been completed, another decision block 36 determines whether a currency deposit flag has been set, indicating the deposit of currency into the currency accumulator 14. If currency has been deposited but a record has not yet been selected, an instruction 38 will cause the program to return to its entry 30. The purpose of this routine is to extend the bonus mode indefinitely after the deposit of some currency until a record selection is made.

Upon completion of a selection, an instruction block 40 resets the selection made and currency deposit flags, another instruction block 42 resets the bonus flag and the program returns to its entry point pursuant to a command 44.

If decision block 36 determines that currency has not been deposited, a bonus interval timer (initiated in a manner to be described) will be decremented according to an instruction block 46. The bonus interval timer is preferably set to offer bonus pricing for a bonus time interval of approximately three minutes. An instruction block 48 will determine when the bonus interval timer reaches zero, that is, times out. If it has, the instructions of blocks 40, 42 and 44 will be followed; if not, a command block 50 returns the program to its entry point 30.

If the bonus mode is not active, a decision block 52 determines whether the random interval is active, that is, whether a random interval timer, which initiates operation of the bonus timer, is operative. If so, the program is continued as illustrated in FIG. 3. If not, in order to begin a random time interval, an instruction block 54 loads the random interval timer, an instruction block 56 sets a random interval flag and an instruction 58 sets an idle flag and also sets a busy counter equal to a time period of five seconds. The program then continues as shown in FIG. 3.

In order to make the mode A, mode B and random play features appear to phonograph customers to be truly random, the instruction block 54 loads the random interval timer with random factors generated during the preceding random time interval by customer activity. Specifically, a random factor is generated each time a credit is added to or removed from the currency accumulator 14, each time the selection keyboard 12 is operated and each time the record play mechanism controller operates. The random time intervals, determined by incrementing a random counter (not shown) into which these random factors are entered, are selected by a switch located within switch block 22 to be preferably within the ranges of either 10 to 30 or 20 to 60 minutes to maximize customer attraction and record selection sales. In the absence of customer activity during the next preceding random time interval, the random timer will repeat predictably the preceding time interval. Because the mechanism controller is designed to rotate its record magazine each time power is initially turned on to supply the phonograph, there will always be a random factor for the random counter.

With reference to FIG. 3, a decision block 60 determines whether the automatic phonograph is idle, that is, whether it is playing records. If so, another decision block 62 will determine whether the busy counter has reached zero. It not, an instruction 64 decrements the busy counter and the program proceeds to an instruction block 66 requiring that the random interval timer be incremented. If decision block 62 determines that the busy counter has reached zero, the instruction block 66 is accessed directly.

If decision block 60 determines that the machine is not idle, an instruction 68 resets the idle flag. A decision block 70 then determines whether the busy counter has reached zero. If so, the random interval timer is incremented according to block 66. If not, the busy counter is reloaded to five seconds according to an instruction block 72. The setting of the busy counter and the idle flag will determine whether the bonus modes A and/or B can be offered upon their selection as will become apparent from the portion of the program illustrated in FIG. 4. It will be recalled that bonus mode A can be offered only if the phonograph is idle during the entire preceding random time interval and that bonus mode B can be offered only if the phonograph has been playing during the entire preceding random time interval.

Following instruction block 66, another decision block 74 determines whether the random interval timer has overflowed beyond a predetermined limit. If it has not, a command 76 requires the program to return to its entry point. If it has, an instruction 78 requires that the random interval flag be reset. The degree by which the random interval timer is incremented determines, in conjunction with the random factors set into the random counter, the length of the random time interval. Regardless of the number of random factors, the random time intervals are limited to fall within one of the previously described 10 to 30 or 20 to 60 minute ranges. Since the random interval timer at this point has determined the random time interval to precondition mode A, mode B and/or random play operation, the program proceeds to examine the settings of switches 22 which, as discussed above, govern selection of these features.

As shown in FIG. 3, a decision block 80 determines whether the random play switch is on to select the random play mode. If so, an instruction block 82 will require the microprocessor to transmit a predetermined free play selection to the record play mechanism controller 16. To make the random play mode appear truly random and to encourage selection of the largest variety of record plays, a random selection register (not shown), which contains the predetermined selections to be offered in this mode, is advanced pursuant to instruction 82 each time this random play mode is operational. Preferably, the random selection register will not contain the most popular record selections stored in the record magazine in order to encourage purchase of selections of lesser popularity.

Continuing with the program as illustrated in FIG. 4, if the mode B switch is on, a decision block 84 requires that another decision block 86 determine whether the busy counter has reached zero. If it has not, indicating that the automatic phonograph has been playing records during the entire random time interval, an instruction block 88 sets or loads the bonus interval timer equal to three minutes. During this limited bonus time period, bonus pricing is offered to the phonograph customers as required by instruction 90.

Under this bonus pricing scheme, a smaller value of currency is required in the accumulator 14 for a selection of any record play in the magazine than under the normally programmed pricing arrangement. Programmable pricing devices for variable currency per play ratios are known in the art and do not require detailed discussion. A command 92 then requires the program to return.

If decision block 86 determines that the busy counter has reached zero, indicating that the phonograph has not been continuously in play during the random time interval, or if the mode B switch is not on, a decision block 94 determines whether the mode A switch is on. If the mode A switch has not been set to select this mode, a command 96 returns the program. If the mode A switch has been set, another decision block 98 determines whether the idle flag has been set. If it has been set, indicating that the phonograph has not been in play during the entire random time interval, instructions 88, 90 and 92 will be followed as previously described. If the idle flag has not been set, indicating that the phonograph has been in play during the random time interval, an instruction 100 will return the program to its entry point.

The microprocessor repeatedly follows the described program to offer bonus mode A, mode B and/or random play operation to phonograph customers as selected by the phonograph operator.

It is thought that the present invention and its attendant advantages will be understood from the foregoing description. It is apparent that changes may be made in the form of its components without departing from the spirit and scope of the invention, the form described being merely a preferred embodiment.

The embodiments of the invention in which an exclusive property or privilege is claimed are defined as follows:

1. In an automatic currency-controlled phonograph having a currency accumulator for storing play credits and a keyboard for selecting plays, a bonus award system comprising:
    random interval timing means for determing random time intervals;
    means for sensing record plays during each random time interval;
    bonus intervl timing means for determining bonus time intervals;
    first optionally operable means for initiating the bonus interval timing means following each random time interval in the absence of record plays therein;
    second optionally operable means for initiating the bonus interval timing means following each random time interval in the presence of record plays therein;
    bonus indicating means operable during each bonus time interval; and
    bonus credit means responsive to currency deposit in the accumulator and being operable to provide bonus pricing for record plays selected during each bonus time interval.

2. The bonus award system of claim 1 wherein the second optionally operable means initiates operation of the bonus interval timing means only upon the continuous presence of record plays during each preceding random time interval.

3. The bonus award system of claim 1 and bonus time interval delay means operable upon currency deposit in the accumulator to extend an initiated bonus time interval until after a keyboard selection has been made.

4. The bonus award system of claim 1 wherein the random interval timing means includes a random interval counter and means for resetting the counter with a random factor generated during a preceding random time interval upon the occurrence of an addition or removal of credit from the accumulator, an operation of the keyboard or the playing of a record.

5. The bonus award system of claim 1 wherein the bonus indicating means is visually presented to a phonograph customer.

6. The bonus award system of claim 1 and optionally operable random play means for initiating free play of one of a predetermined plurality of record selections following each random time interval.

7. The bonus award system of claim 4 wherein the random play means comprises:
    storage means for the predetermined plurality of record selections; and
    sequencing means for effecting sequential play of the selections stored in the storage means.

* * * * *

UNITED STATES PATENT OFFICE
CERTIFICATE OF CORRECTION

Patent No. 4,258,838   Dated March 31, 1981

Inventor(s) Donald C. Rockola

It is certified that error appears in the above-identified patent and that said Letters Patent are hereby corrected as shown below:

Column 2, line 2 "phonograh" should be -- phonograph --

Column 2, line 27 "EMODIMENT" should be -- EMBODIMENT --

Column 3, line 66 "It not" should be -- If not --

Column 5, line 39 "intervl" should be -- interval --

Signed and Sealed this

Eighteenth Day of August 1981

[SEAL]

Attest:

Attesting Officer

GERALD J. MOSSINGHOFF

Commissioner of Patents and Trademarks